US006978643B2

(12) United States Patent
Akers et al.

(10) Patent No.: US 6,978,643 B2
(45) Date of Patent: Dec. 27, 2005

(54) MULTIPLE LAYER INSULATING SLEEVE (75) Inventors: Jessica L. Akers, El Paso, TX (US); Harry F. Gladfelter, Kimberton, PA (US); Janice R. Maiden, Flourtown, PA (US); Danny E. Winters, Downingtown, PA (US); Linwood R. Ludy, Pottstown, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 214 days.

(21) Appl. No.: 10/600,944

(22) Filed: Jun. 20, 2003

(65) Prior Publication Data
US 2004/0003630 A1 Jan. 8, 2004

Related U.S. Application Data (60) Provisional application No. 60/390,223, filed on Jun. 20, 2002.

(51) Int. Cl.[7] .............................................. D04B 1/22
(52) U.S. Cl. ...................................................... 66/170
(58) Field of Search ...................... 66/171, 196, 178 R, 66/185, 186, 187; 138/123, 124, 125, 126, 138/127, 137

(56) References Cited

U.S. PATENT DOCUMENTS

| 2,222,522 A | 11/1940 | Webster ........................ 308/243 |
| 2,436,318 A | 2/1948 | McDonough .................. 66/93 |
| 2,881,603 A | 4/1959 | Vendetti ........................... 66/9 |
| 3,862,878 A | 1/1975 | Azuma ........................... 161/58 |
| 4,104,892 A | 8/1978 | Thorneburg .................... 66/185 |
| 4,341,096 A * | 7/1982 | Safrit et al. .................... 66/185 |
| 4,570,679 A | 2/1986 | Schippl .......................... 138/149 |
| 4,571,960 A * | 2/1986 | Hursh et al. ................... 66/196 |
| 4,615,188 A * | 10/1986 | Hursh et al. ................... 66/196 |
| 4,931,326 A * | 6/1990 | Weil ............................ 428/35.8 |
| 5,373,713 A | 12/1994 | Miller ............................. 66/196 |
| 5,509,282 A | 4/1996 | Ferrell, Jr. ...................... 66/188 |
| 5,617,900 A | 4/1997 | Weil ............................. 138/127 |
| 5,636,533 A | 6/1997 | Hunneke et al. ............... 66/196 |
| 5,675,992 A * | 10/1997 | Wrightenberry ........... 66/178 R |
| 5,744,206 A | 4/1998 | Russek et al. .............. 428/36.3 |
| 5,778,702 A * | 7/1998 | Wrightenberry ........... 66/178 R |

FOREIGN PATENT DOCUMENTS

| EP | 97902439.5 | 2/1997 | |
| WO | WO 90/09281 | 8/1990 | ............ B32B 17/02 |

* cited by examiner

Primary Examiner—Danny Worrell
(74) Attorney, Agent, or Firm—Synnestvedt & Lechner LLP (57) ABSTRACT

Multilayer sleeves for insulating or protecting elongated substrates are disclosed. The sleeves are continuously knitted in different sections integrally joined end to end, the sections being formed of different filamentary members chosen for desired characteristics. The sleeves are formed into the multilayer configuration by reverse folding the sleeves inwardly to place one section coaxially within another. Sleeve ends may be finished with welts to prevent raveling and serve as a clinch on the elongated substrates. Rib knits are used to form insulating air pockets lengthwise along the sleeves to augment the insulating effectiveness.

44 Claims, 6 Drawing Sheets

MULTIPLE LAYER INSULATING SLEEVE

RELATED APPLICATION

This application is based on and claims priority to U.S. Provisional Application No. 60/390,223, filed Jun. 20, 2002.

FIELD OF THE INVENTION

This invention relates to flexible sleeving products and more particularly to a sleeve for insulating a tubular member such as an automotive exhaust gas recirculating device. Other exemplary applications of the invention include thermal protection of delicate tubular instruments and acoustic isolation of tubular devices.

BACKGROUND OF THE INVENTION

Lightweight sleeves knitted, woven or braided of bulky yarns for purposes such as the insulation of elongated tubular items are known in the art. An exemplary application of such sleeving is the insulation of exhaust gas recirculating devices so as to minimize the damage to other automotive components which such devices are in proximity to. A product of the type referred to is the sleeving of U.S. Pat. No. 5,671,649 in which spirally extending warp elements of relatively large diameter are utilized to stand a braided insulating sleeve away from the item being insulated, thereby creating an air gap in order to even out hot spots and thereby to increase the insulating capabilities of the product. Another form of sleeving is disclosed in U.S. Pat. No. 5,849,379. The sleeve disclosed in this patent combines a comb-like wire frame spaced between the item being insulated and the insulating material and also between layers of insulating material. The product is a split sleeve which facilitates the installation over previously installed tubular heat sources. The inner wire skeleton serves as a spacer layer for maintaining a space between the tubular heat source and the inner layer of the sleeve. Although the products described have, to a large degree, satisfied the need for sleeving which protects nearby components from temperatures ranging from between about 1000° F. and 1800° F., the need persists for sleeving devices which combine the advantages of ease of manufacture, low price, reduced weight and use of high-efficiency insulating yarns.

SUMMARY AND OBJECTS OF THE INVENTION

The invention concerns a sleeve for receiving elongated items. The sleeve comprises a flexible first tubular segment having opposite ends and comprised of filamentary members interlaced together and a flexible second tubular segment having opposite ends and comprised of filamentary members interlaced together. One end of the first segment is joined to one end of the second segment, the second segment being drawn coaxially within the first segment to form inner and outer adjacent layers surrounding a central space, a reverse fold being formed between the segments and defining one end of the sleeve.

In the sleeve according to the invention, the first segment may be comprised of first filamentary members and the second segment may be comprised of second filamentary members different from the first filamentary members. The filamentary members may differ in one or more of any number of characteristics including material properties such as the type of material, stiffness, strength, degree of abrasion resistance, resistance to heat and heat transfer as well as physical properties such as denier and color and even in the manner in which they are interlaced. For example, when interlaced by knitting, the density or type of knit structure used may be varied or, if braided, by the type of braid used in each segment.

Preferably, the first and second segments are substantially equal in length, the other ends of the first and second segments being positioned adjacent to one another to define another end of the sleeve.

The sleeve may also comprise a plurality of ribs formed lengthwise along either or both of the first or second segments. When formed on the second segment, the ribs preferably face outwardly from the central space and engage the first segment to separate the layers and form a plurality of air pockets between them. When formed on the first segment, the ribs preferably face inwardly toward the central space and engage the second segment to form the air pockets between the layers of the first and second segments.

The sleeve may also comprise additional segments. For example, a third tubular segment comprising interlaced filamentary members and having opposite ends may be joined to another end of the first segment. The third segment may be drawn coaxially within the first segment to form other inner and outer adjacent layers surrounding the central space, whereby another reverse fold is formed between the third and the first segments to another end of the sleeve. The third segment may also be drawn coaxially over the first segment to form another outer layer surrounding the inner and outer adjacent layers. Another reverse fold is thus formed between the third and the first segments which defines another end of the sleeve.

The filamentary members comprising the third segment may be different from those comprising the first and second segments in any of the aforementioned characteristics.

In another embodiment, the sleeve comprises an elongated, flexible, continuous tube comprising a plurality of base filamentary members interlaced together. A first portion of the tube has a first plurality of filamentary members interlaced with the base filamentary members and a second portion of the tube has a second plurality of filamentary members interlaced with the base filamentary members. The tube is reverse folded with the first portion of the tube being positioned within the second portion of the tube.

Preferably, the first portion is positioned in spaced relation to the second portion along the tube so that a portion of the base filamentary members of the continuous tube are substantially exposed. The reverse fold is advantageously positioned between the first and the second portions.

The sleeve may also comprise a third portion of the tube having a third plurality of filamentary members interlaced with the base filamentary members. In this embodiment the second portion is positioned between the first and the third portions. The tube is again reverse folded with the second portion of the tube being positioned within the third portion of the tube.

Preferably, the third portion is positioned in spaced relation to the second portion along the tube and the reverse fold is positioned between the second and the third portions.

The base filamentary members may comprise flexible, resilient metal wire, and the interlaced filamentary members comprise other types of materials, for example, temperature resistant materials such as silica, glass and quartz. Preferably, the filamentary members are interlaced by knitting.

The various embodiments are provided by way of example only, and practical embodiments may have fewer or greater numbers of layers than in the examples.

The invention also contemplates a method of forming a sleeve having a plurality of layers. The method comprises the steps of:

(A) selecting first filamentary members; selecting a first technique for interlacing the first filamentary members;

(B) selecting first parameters related to the first technique for interlacing the first filamentary members;

(C) interlacing the first filamentary members using the selected first technique and first parameters to form a first flexible tubular segment having oppositely disposed ends;

(D) selecting second filamentary members;

(E) selecting a second technique for interlacing the second filamentary members;

(F) selecting second parameters related to the second technique for interlacing the first filamentary members;

(G) interlacing the second filamentary members using the selected second technique and second parameters to form a second flexible tubular segment, the second filamentary members being continuously interlaced with the first filamentary members to form the second flexible tubular segment continuously from one end of the first flexible tubular segment; and (H) drawing the second tubular segment coaxially within the first tubular segment.

Preferably, the first and second tubular segments are formed by knitting, and the segments are integrally joined by interknitting the filamentary members of the first segment with the second segment at the one ends of the tubes.

It is an object of the invention to provide a sleeve which receives elongated items.

It is another object of the invention to provide a sleeve which has multiple layers positioned adjacent one another.

It is yet another object of the invention to provide a sleeve which can be knitted of different materials in a continuous process.

It is again another object of the invention to provide a sleeve in which the various layers have different characteristics from one another.

These and other objects and advantages of the invention will become apparent upon consideration of the drawings and the detailed description of the preferred embodiments.

DETAILED DESCRIPTION OF THE PREFERRED EMBODIMENTS

Figure 1:
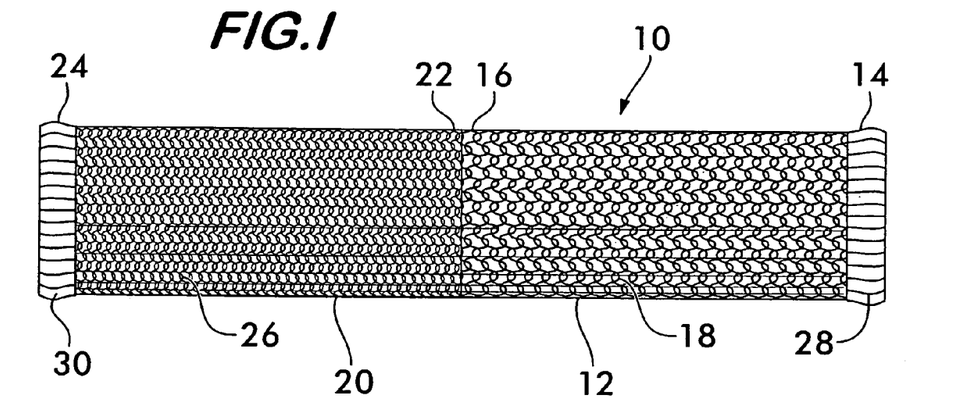
FIG. 1 is a side view of a sleeve according to the invention shown prior to its formation into a multi-layered form.
Figure 2:
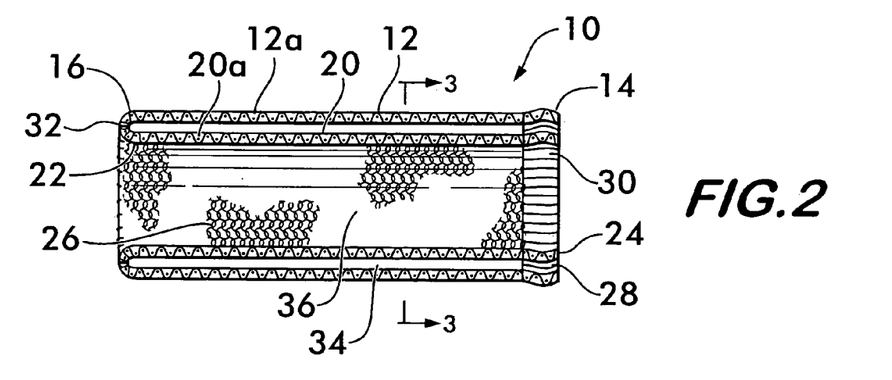
FIG. 2 is a longitudinal sectional view of the sleeve shown in FIG. 1, the sleeve being shown after its formation into a multi-layered form.

FIGS. 1 and 2 show a sleeve 10 according to the invention. Sleeve 10 comprises a first flexible tubular segment 12 having oppositely disposed ends 14 and 16, the segment 12 being formed from interlaced filamentary members 18. Filamentary members 18 are preferably interlaced by knitting to give the sleeve 10 flexibility and elasticity to allow it to conform closely to the shape and path of an elongated substrate. Filamentary members 18 have certain characteristics, which may include the type of material from which they are comprised, the style of interlacing, for example, a particular type of knit or weave or a particular density of knit or weave, or a particular property such as strength, resistance to abrasion, resistance to heat transfer, inflammability or the ability to damp vibration. These characteristics are chosen in the context of a particular environment and function which the sleeve is intended to perform as described below.

Sleeve 10 comprises a second flexible tubular segment 20, also having oppositely disposed ends 22 and 24 and comprised of interlaced filamentary members 26, preferably knitted and having different characteristics from the filamentary members 18. End 22 of segment 20 is attached to end 16 of segment 12, the segments being preferably integrally joined by interknitting of the filamentary members 18 and 26 to form a substantially continuous sleeve in a substantially continuous process described below. Preferably, the free ends 14 and 24 of the segments 12 and 20 are finished with welts 28 and 30 to help prevent raveling of the segments and present a finished appearance. The welts also serve to clinch an elongated substrate positioned within the sleeve 10 to maintain the position of the sleeve on the substrate.

FIG. 1 shows the sleeve 10 as knitted but before being formed into a multilayer configuration. The sleeve 10 is completed as shown in FIG. 2 by folding one of the segments, in this example segment 20, circumferentially inwardly, thereby forming a reverse fold 32 and drawing the segment 20 coaxially within the central space 34 defined by the first segment 12. The segment 20 defines a central space 36 for receiving the elongated substrates to be protected, such as an automotive exhaust gas recirculating (EGR) tube. Together, the segments 12 and 20 form outer and inner adjacent layers 12a and 20a surrounding the central space 36. It is also feasible to draw the segment 12 within the central space 36 defined by the segment 20.

Segments 12 and 20 are preferably substantially equal in length to one another and are reverse folded so that the reverse fold 32 is positioned between the segments and ends 24 and 14 are adjacent to one another. However, the segments 12 and 20 need not be the same length, the reverse fold 32 need not fall between the segments, and the ends 24 and 14 need not be adjacent as all of these parameters are variable and may be adjusted as needed for a particular application.

As noted above, filamentary members 18 and 26 have different characteristics chosen for particular properties desired for the sleeve 10 in response to the function and/or the environment to which the sleeve will be subjected. For example, if the sleeve is to insulate an EGR tube, then it is preferred to knit the inner segment 20 from filamentary members having high-temperature resistance, such as glass, quartz or other mineral fibers. High-temperature resistance is necessary since the inner segment 20 will be in contact with the EGR tube, which can reach temperatures in excess of 1000° F. However, glass fibers are a major skin irritant when handled during installation. To avoid irritation, the outer segment 12 is knitted from DREF yarns having a glass fiber core and a coating of non-irritating fibers such as para-aramids. Oxidized polyacrylonitrile fibers, which have high-temperature resistance but are non-irritants may also be used to knit outer segment 12. Although it is possible to knit a sleeve entirely from DREF yarns, it is more economical to use the more expensive DREF or oxidized polyacrylonitrile fibers only on the outer segment 12 where their non-irritating characteristics are needed, confining the less expensive but irritating glass fibers to the inner segment 20. To ensure that the technician installing the sleeve has little to no chance of coming into contact with the irritating filamentary members 26 comprising the inner segment 20, it is advantageous to form the welt 30 on the inner segment 20 from the same material as used for the outer segment 12.

Figure 3:
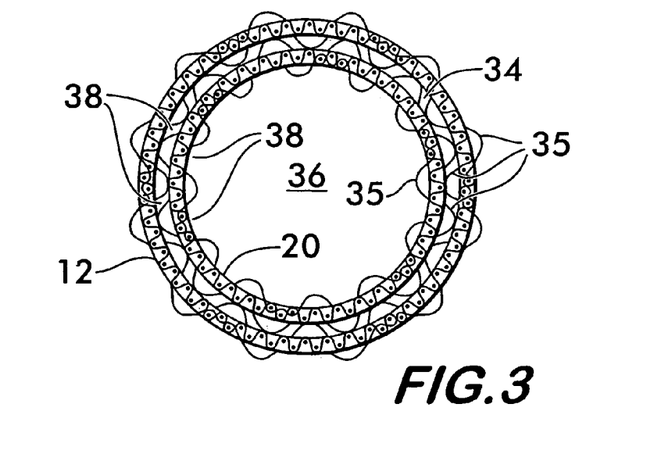
FIG. 3 is a cross-sectional view taken at line 3—3 in FIG. 2.

High-temperature applications may require augmenting the insulating properties of the sleeve 10. This can be readily accomplished by using a rib knit to construct either or both segments 12 and 20 to form integral ribs lengthwise along the sleeve. As shown in the cross-sectional view of FIG. 3, ribs 35 may extend inwardly from outer segment 12 and/or outwardly from inner segment 20 to act as spacers to form air pockets 38 between the tubes 12 and 20 and thereby reduce the contact surface between the segments to reduce heat transfer. Additional ribs 35 may extend outwardly from outer segment 12 and/or inwardly from inner segment 20. Such ribs provide further air pockets 38 between the inner segment 20 and an item, such as the EGR tube which the sleeve surrounds, or prevents direct contact with the outer segment 12 by acting as bumpers. Bumpers are useful to prevent abrasion of the outer segment 12 and absorb impact.

Figure 4:
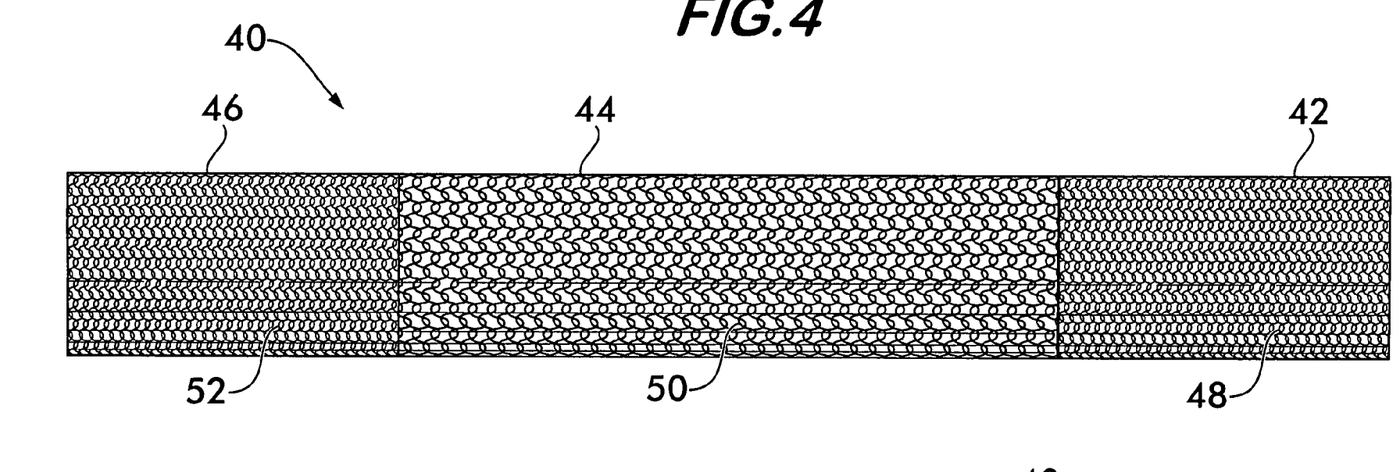
FIG. 4 is a side view of a sleeve according to the invention shown prior to its formation into a multi-layered form.
Figure 5:
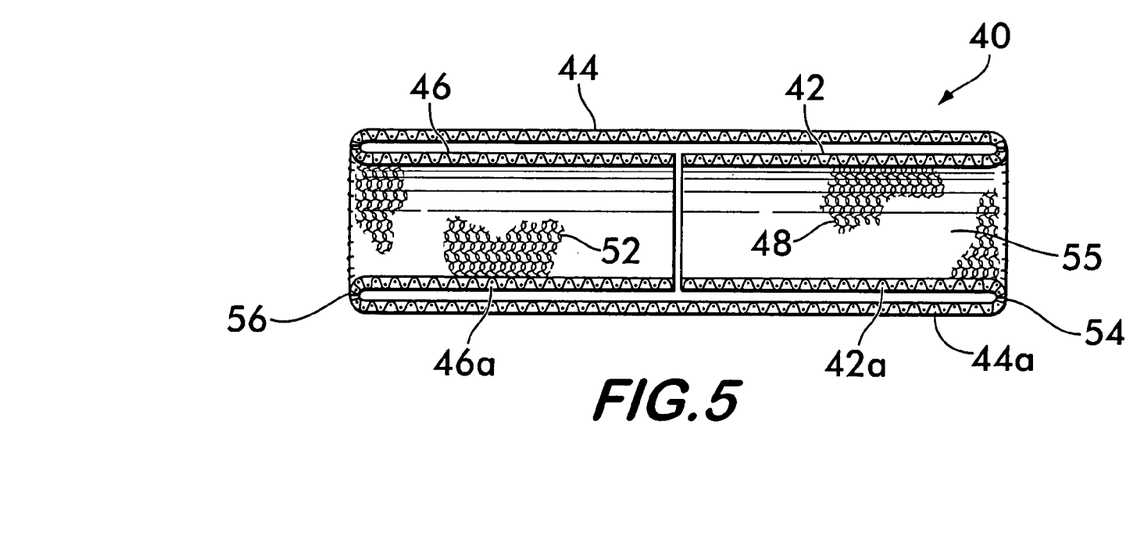
FIG. 5 is a longitudinal sectional view of the sleeve shown in FIG. 4, the sleeve being shown after its formation into a multi-layered form.

FIGS. 4 and 5 show another embodiment of the invention comprising a sleeve 40 formed of three flexible tubular segments 42, 44 and 46. Preferably, the segments are integrally joined end-to-end, the segments 42, 44 and 46 being formed respectively from filamentary members 48, 50 and 52, preferably interlaced by knitting to form a substantially continuous sleeve. To configure the sleeve 40 into its final form as shown in FIG. 5, reverse folds 54 and 56 are formed in either or both end segments 42 and 46 or in middle segment 44 by circumferentially folding the end segments 42 and 46 inwardly within the middle segment 44. The segments 42 and 46 are drawn coaxially within segment 44, thereby forming sleeve 40 having multiple layers 42a, 44a and 46a surrounding and defining a central space 55. As with the sleeve embodiment shown in FIGS. 1 and 2, either one or both of the inner segments 42 and 46 have characteristics that are different from the characteristics of the outer segment 44. Sleeve 40 is preferably a weltless design with the free ends of the tubes 42 and 46 being finished by a sewing process to prevent raveling. Welts could also be used, however. Note that segments 42 and 46 are approximately half as long as segment 44, but other length ratios are also feasible. In an alternate embodiment, segments 42 and 46 may also be drawn over the outside of tube 44 to form the multi-layer sleeve 40.

Figure 6:
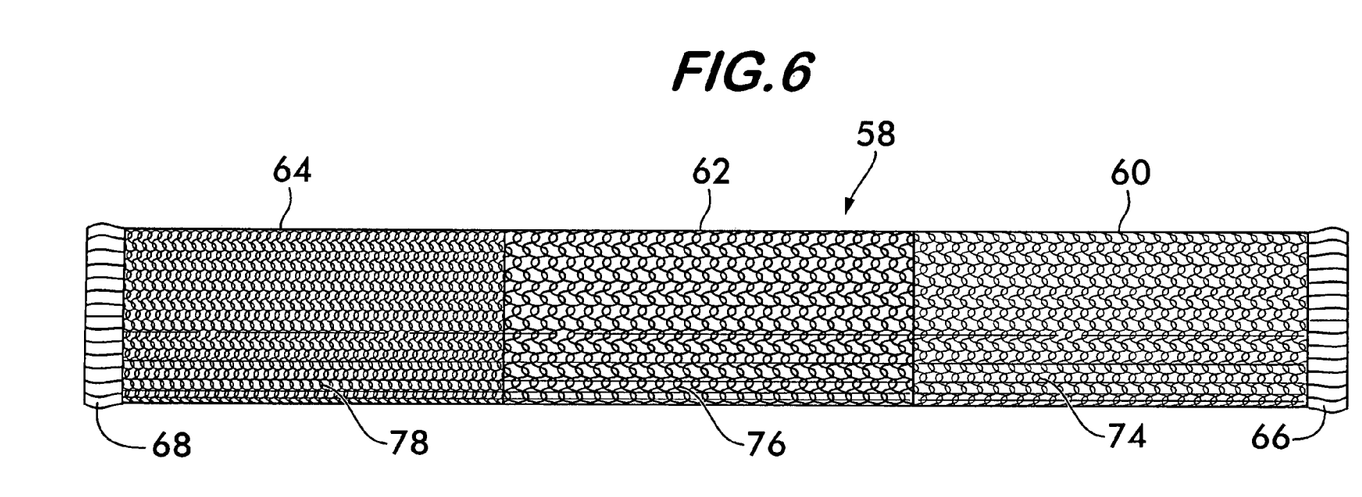
FIG. 6 is a side view of a sleeve according to the invention shown prior to its formation into multi-layered form.
Figure 7:
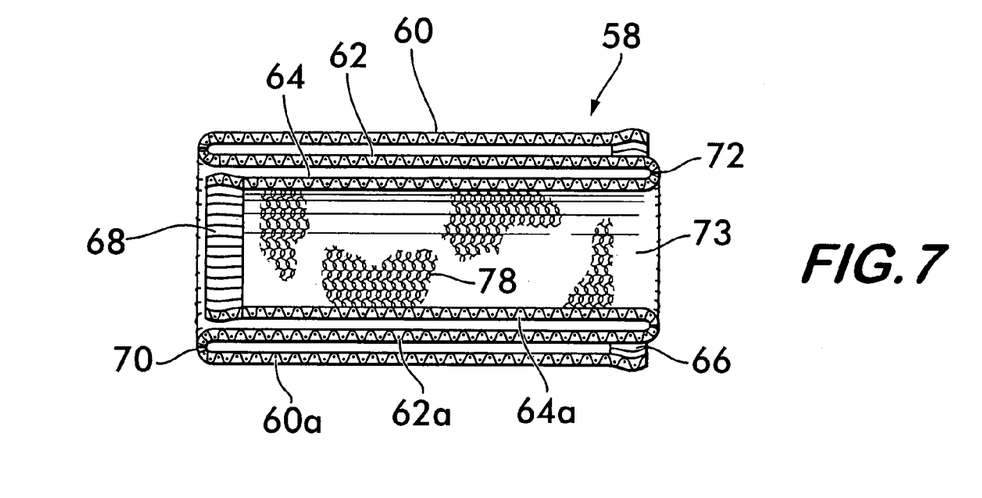
FIG. 7 is a longitudinal sectional view of the sleeve shown in FIG. 6, the sleeve being shown after its formation into a multi-layered form.

FIGS. 6 and 7 show yet another embodiment of the invention, sleeve 58, formed of three flexible tubular segments 60, 62 and 64. The segments are integrally joined end to end with the free ends of segments 60 and 64 preferably finished with welts 66 and 68 for reasons explained below. As shown in FIG. 7, the sleeve 58 is configured by forming two reverse folds 70 and 72, wherein the segments are circumferentially folded to allow segment 62 to be drawn within the segment 60 and segment 64 to be drawn within the segment 62 to form a sleeve having three adjacent layers 60a, 62a and 64a surrounding a central space 73.

The filamentary members 74, 76 and 78 respectively forming the segments 60, 62 and 64 are preferably interlaced by knitting. One or more of the filamentary members may have different characteristics chosen for specific properties such as heat-resistance, abrasion-resistance, damping as described above. Welts 66 and 68 are positioned at opposite ends of sleeve 58 and act as elastic cinches to secure the sleeve to an item received within the central space 73.

Manufacture of sleeves according to the invention is advantageously accomplished on circular knitting machines having multiple feeders capable of handling multiple different filamentary members and capable of knitting different stitch types and different stitch densities. In one example, wherein the material properties of the segments are different from one another, a first segment is knitted using a filamentary member comprised of a first material held on a first feeder of the machine. When the first segment is completed, a second feeder is brought into action which introduces a second filamentary member of a different material to the needles. The first feeder drops out of cooperation with the needles, the first filamentary member is cut and the knitting proceeds with the second filamentary member on the second feeder. This process may be repeated for as many times as required depending upon the number of segments needed (corresponding to the number of layers in the sleeve). Filamentary members, once taken out of action, may be reintroduced into the knitting process, as, for example, when a welt is to be knitted from a first material on the end of a segment comprised of a second material as described above with reference to FIGS. 1 and 2. Other characteristics, including parameters such as knit density or stitch type, may be varied in addition to or instead of material type during the knitting process by controlling the actions of the needles and hooks. This is usually accomplished by programming the machine to knit a predetermined number of courses of a particular stitch or knit density, followed by another number of courses having a different stitch type and/or density.

Figure 9:
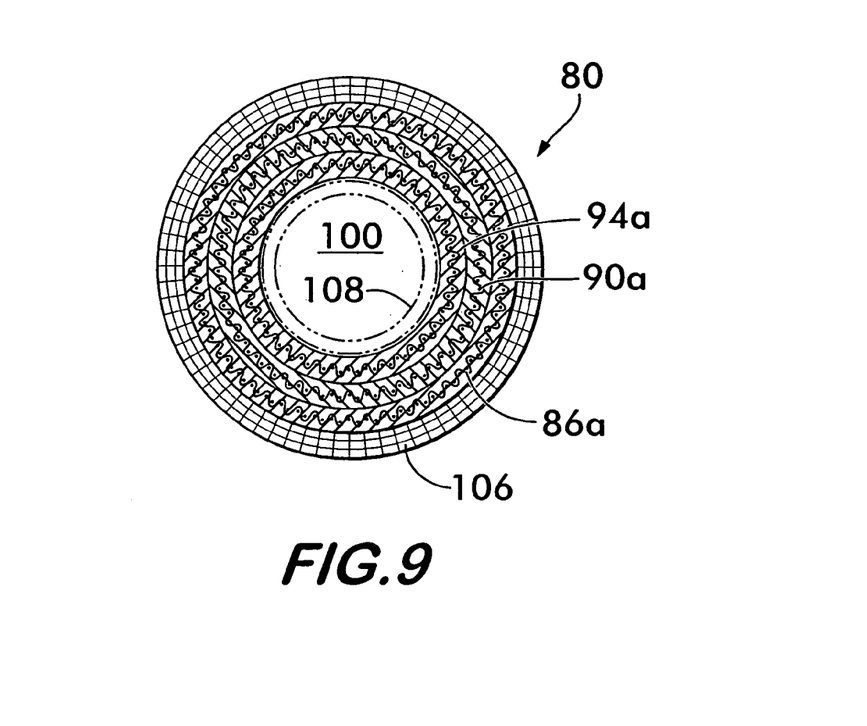
FIG. 9 is a cross-sectional view taken at line 9—9 of FIG. 8.
Figure 10:
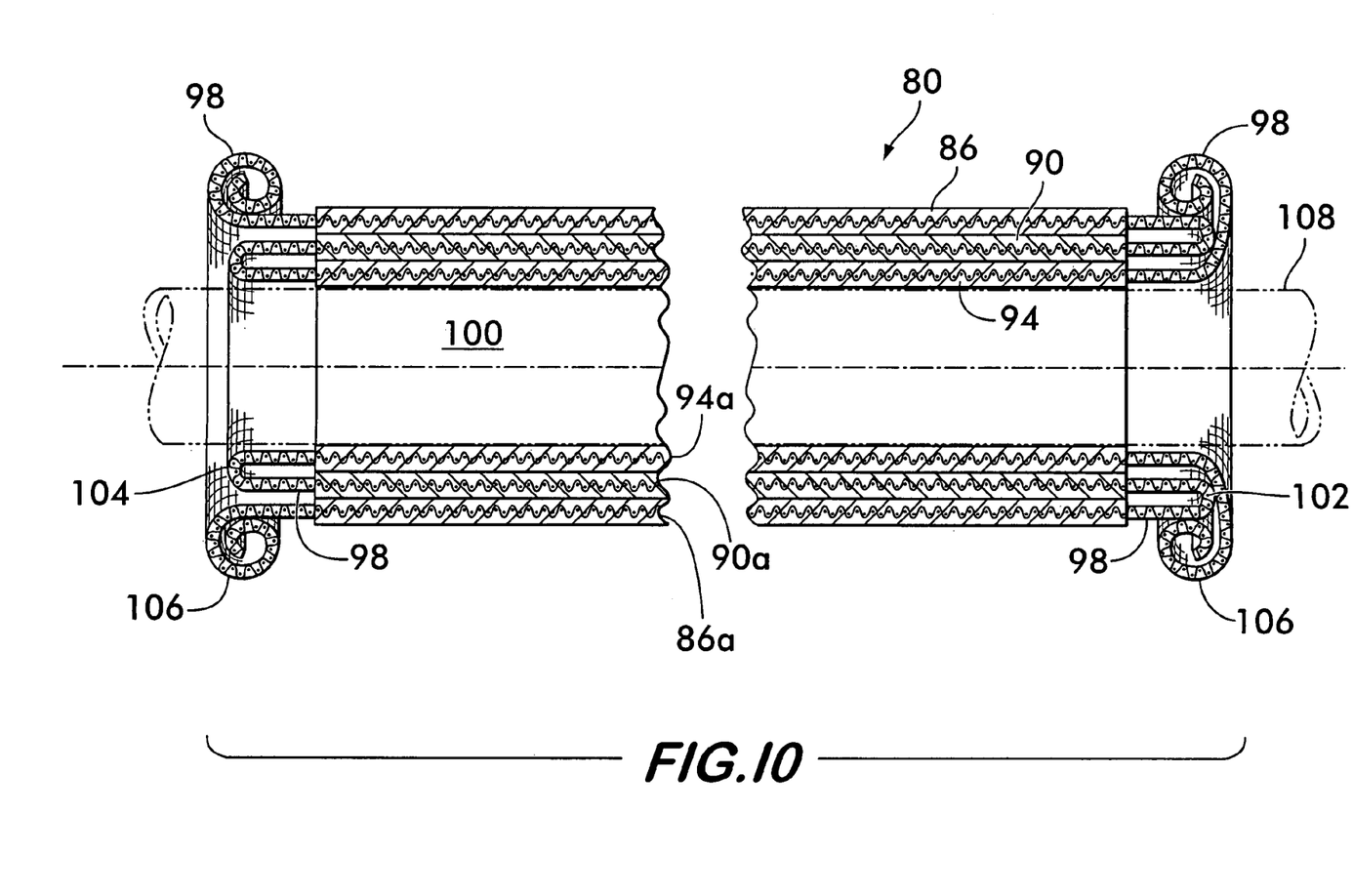
FIG. 10 is a longitudinal sectional view of the sleeve taken at line 10—10 of FIG. 8.
Figure 11:
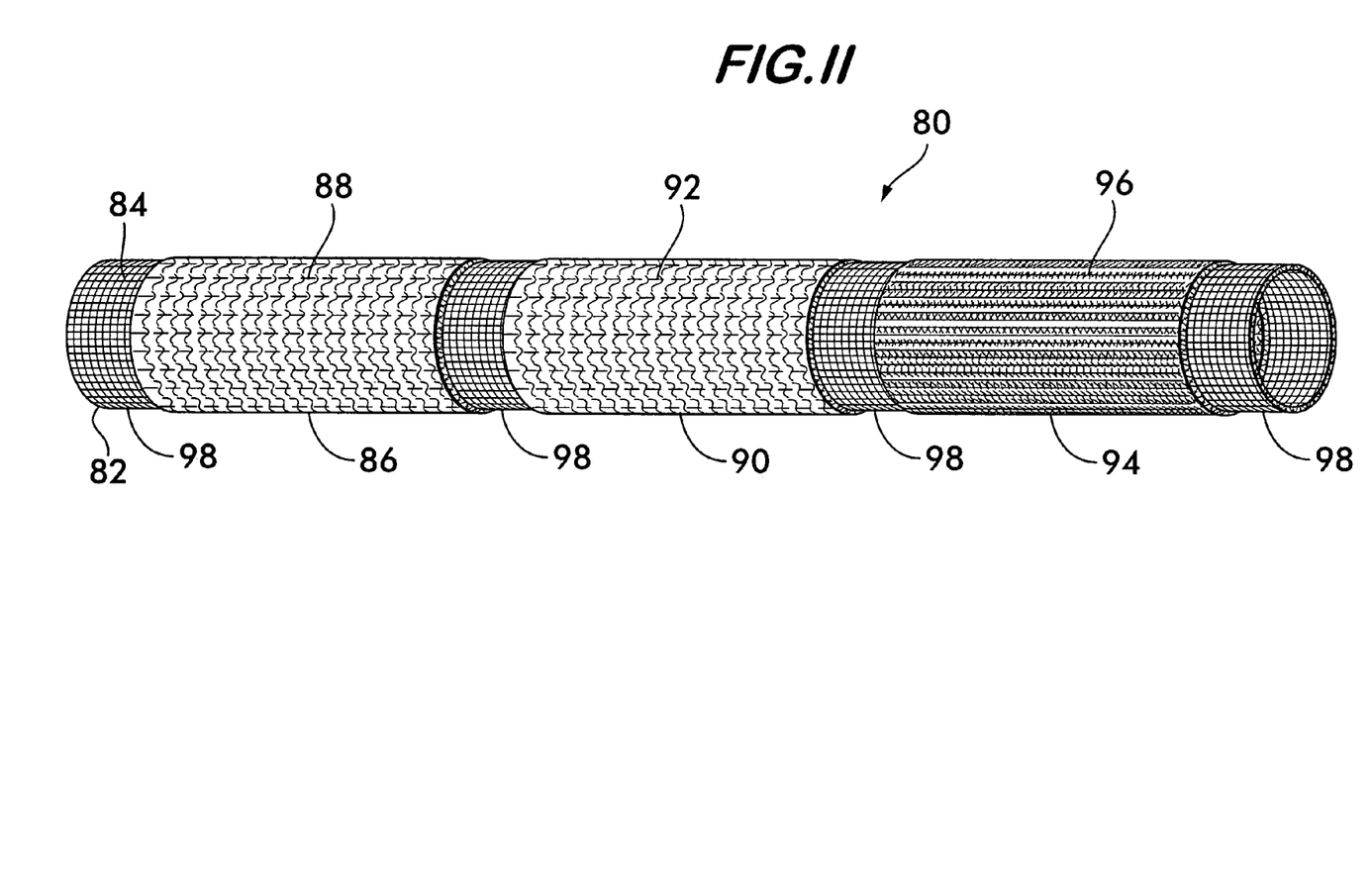
FIG. 11 is a perspective view of a multi-sectioned sleeve shown prior to its formation into multi-layered form.

FIGS. 8–11 illustrate another sleeve embodiment 80 according to the invention. As best shown in FIG. 11, the sleeve comprises an elongated, flexible, continuous tube 82 formed of interlaced filamentary members 84, preferably interlaced by knitting. The filamentary members 84 of a first portion 86 of tube 82 are interlaced with first filamentary members 88, the filamentary members 88 having different characteristics than the base filamentary members 84. The filamentary members 84 of a second portion 90 of tube 82 are interlaced with second filamentary members 92, which may be the same or different from first filamentary members 88. Filamentary members 84 of a third portion 94 of tube 82 are interlaced with third filamentary members 96, which may be the same as or different from the first and second filamentary members 88 and 92. Preferably, the various portions 86, 90 and 94 respectively defined by the interlaced filamentary members 88, 92 and 96 are positioned in spaced relation along tube 82 and separated by one another by regions 98 wherein the base filamentary members 84 comprising tube 82 are substantially exposed. The portions 86, 90 and 94 are preferably substantially equal in length to one another, but could also have different lengths. It is also understood that three portions are chosen for purposes of illustration, and there could be more or fewer portions depending upon the requirements driving the design.

As shown in FIG. 10, the sleeve 80 according to the invention is formed by reverse folding the portions illustrated in FIG. 11 so as to draw third portion 94 coaxially within second portion 90, and second portion 90 within first portion 86 so as to form multiple adjacent layers 94a, 90a and 86a surrounding and defining a central space 100 as best shown in FIG. 9. Preferably, as shown in FIG. 10, reverse folds 102 and 104 coincide with the separation regions 98 upon completion of the sleeve 80. Positioning the reverse fold at the separation regions avoids placing strain on brittle fibers which may comprise the filamentary members interlaced with the tube 82 to define the portions which form the adjacent layers. The separation regions also tend to be less bulky and more flexible than the portions 86, 90 and 94 and will facilitate the formation of the reverse folds and not substantially increase the diameter of the sleeve 80. Separation regions 98 at the free ends of the tube 82 may be rolled back to form finished ends 106 for the sleeve 80.

Figure 8:
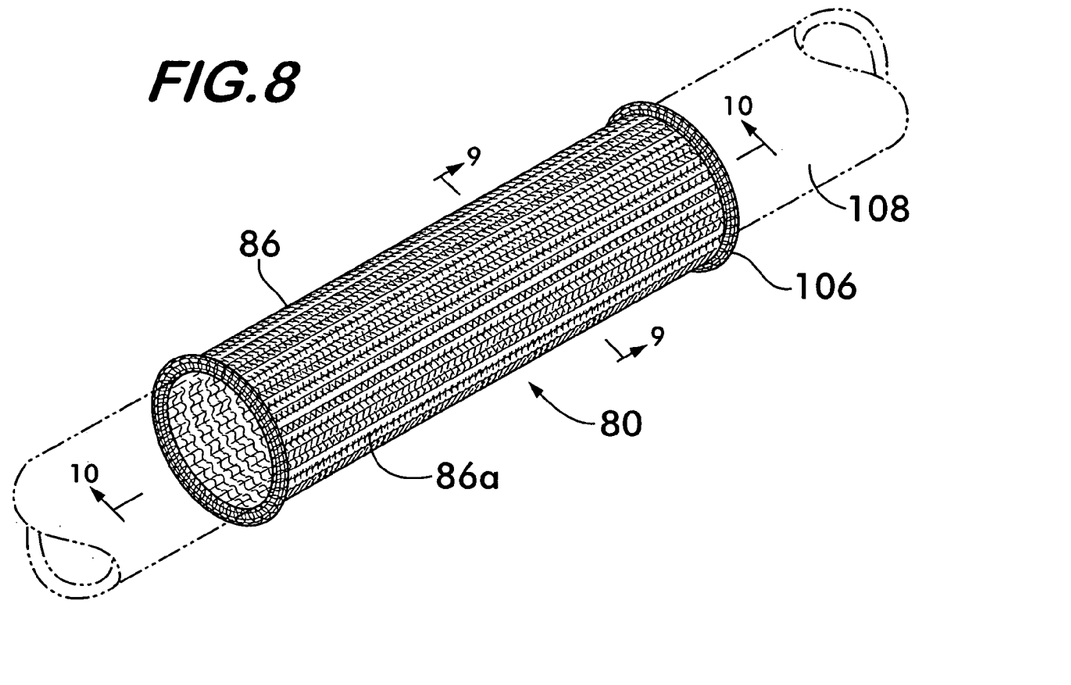
FIG. 8 is a perspective view showing a multi-layered sleeve formed in accordance with the invention.

In a specific example of sleeve 80 which is intended to insulate a tubular heat source 108, such as an EGR tube in an automobile, the tube 82 is knitted of base filamentary members 84 comprising a stainless steel, full-hard wire having a diameter of about 0.04 inches. The innermost portion 94 of the sleeve 80 comprises a high-temperature resistant ceramic yarn, such as a silica yarn of 1600 denier interknitted with the resilient base wire 84. The middle portion 90 is formed by interknitting with the base wire 84 a multifilament glass fiber yarn, such as an E-glass yarn of 200–6000 denier, although in some applications where extremely high temperatures are encountered, a silica yarn or other ceramic yarn may be employed, either alone or blended with glass fiber. In the illustrative sleeve 80 having three layers, the outermost portion 86 is comprised of E-glass of 200–6000 denier interknitted with the wire 84 comprising the tube 82.

An exemplary silica yarn is a multifilament texturized yarn of 1600 denier as manufactured by BelChem of Ebisdorf, Germany, under the trademark belCoTex. Other ceramic yarns which may be employed are K-type silica yarns, such as that distributed in the U.S. under the tradename Siltex. Yarns in the portion 90 forming the intermediate layer 90a may be blended yarns of ceramic and glass fiber and are preferably texturized so that they are lofty or bulky, thereby improving insulation qualities.

With reference to FIG. 11, the sleeve is preferably fabricated in a continuous process as a single elongated, flexible tube 82. Although the tube 82 with its interlaced portions 86, 90 and 94 may be formed by braiding or weaving, a striper knitter is used in carrying out a preferred method of manufacture. A striper knitter suitable for the purpose is manufactured by the Tritex International Limited of Leicester, England. Such a machine is a circular weft knitter, Model No. TX900, capable of knitting tubular fabric having a diameter of between about 0.875 and 1.75 inches utilizing different types of yarn in different tubular sections. The striper knitter has separate groupings of needles which pick up different groups of yarns selectively so as to knit a tubular article with yarns having differing characteristics at locations spaced lengthwise along the article.

Once the tube 82 is knitted with its portions 86, 90 and 94, it is placed on a mandrel for forming into the multi-layer sleeve 80. This is accomplished by reverse folding the first and second portions 86 and 90 over third portion 94 until the second portion 90 fully covers the third portion. The first portion 86 is then pulled back over the second and third portions 90 and 94. The end regions 98 at the free ends of the first and third portions 86 and 94 are then rolled back as shown in FIGS. 1 and 10 and crimped or fused to provide finished ends 106 for the sleeve. The sleeve 80 as described is simple to make and has been found to effectively insulate an EGR tube, with surface temperatures as high as about 1800° F. The construction is relatively light in weight and extremely durable. The stainless steel wire forming the tube 82 disperses the heat effectively along the length of the sleeve 80, thereby avoiding degradation of the insulating yarns by eliminating hot spots. Since the sleeve is a continuous tubular member folded back upon itself a multiplicity of times to form multiple layers, end fray and delamination of the layers are avoided. Further, the separation regions 98 exclusively formed of knitted wire serve as attachment collars or grommets for attachment of the sleeve ends to the ends of an item being insulated.

The flexible multi-layer sleeve according to the invention provides a lightweight, extremely durable and relatively inexpensive sleeve for receiving elongated items. The sleeve is versatile in that it can be tailored to any geometry and use virtually any type of filamentary members to adapt to extreme environments of heat, cold, vibration and shock for the protection and/or isolation of elongated items.

What is claimed is:

1. A sleeve for receiving elongated items, said sleeve comprising:
   a flexible first tubular segment having opposite ends and comprising first filamentary members interlaced together;
   a flexible second tubular segment having opposite ends and comprising second filamentary members interlaced together, said second filamentary members being different from said first, one end of said first segment being joined to one end of said second segment, said second segment being reverse folded and drawn coaxially within said first segment to form inner and outer adjacent layers surrounding a central space, a reverse fold defining one end of said sleeve; and
   a plurality of ribs formed lengthwise along said second segment, said ribs facing outwardly from said central space and engaging said first segment, said ribs separating said layers and forming a plurality of air pockets therebetween.

2. A sleeve according to claim 1, wherein said segments are integrally joined with one another.

3. A sleeve according to claim 1, wherein said reverse fold is positioned between said segments.

4. A sleeve according to claim 3, wherein said first and second segments are substantially equal in length, other ends of said first and second segments being positioned adjacent to one another and defining another end of said sleeve.

5. A sleeve according to claim 1, wherein said other ends of said first and second segments are welted.

6. A sleeve according to claim 1, wherein said filamentary members are interlaced by knitting, said second segment comprising a rib-knit stitch, said ribs being integrally formed in said second segment.

7. A sleeve for receiving elongated items, said sleeve comprising:
   a flexible first tubular segment having opposite ends and comprising first filamentary members interlaced together;
   a flexible second tubular segment having opposite ends and comprising second filamentary members interlaced together, said second filamentary members being different from said first, one end of said first segment being joined to one end of said second segment, said second segment being reverse folded and drawn coaxially within said first segment to form inner and outer adjacent layers surrounding a central space, a reverse fold defining one end of said sleeve; and a plurality of ribs formed lengthwise along said first segment, said ribs facing inwardly toward said central space and engaging said second segment, said ribs separating said layers and forming a plurality of air pockets therebetween.

8. A sleeve according to claim 7, wherein said filamentary members are interlaced by knitting, said first segment comprising a rib-knit stitch, said ribs being integrally formed in said first segment.

9. A sleeve according to claim 1, wherein said filamentary members are interlaced by knitting.

10. A sleeve for receiving elongated items, said sleeve comprising:
a flexible first tubular segment having opposite ends and comprising first filamentary members interlaced together;
a flexible second tubular segment having opposite ends and comprising second filamentary members interlaced together, said second filamentary members being different from said first, one end of said first segment being joined to one end of said second segment, said second segment being reverse folded and drawn coaxially within said first segment to form inner and outer adjacent layers surrounding a central space, a reverse fold defining one end of said sleeve; and
a third tubular segment comprising interlaced filamentary members and having opposite ends, one of said ends of said third segment being joined to another end of said first segment, said third segment being drawn coaxially within said first segment to form other inner and outer adjacent layers surrounding said central space, another reverse fold defining another end of said sleeve.

11. A sleeve according to claim 10, wherein another end of said third segment is positioned proximate to another end of said second segment.

12. A sleeve according to claim 11, wherein said second and third segments are approximately one half the length of said first segment.

13. A sleeve according to claim 12, wherein said reverse folds are positioned between said segments.

14. A sleeve for receiving elongated items, said sleeve comprising:
a flexible first tubular segment having opposite ends and comprising first filamentary members interlaced together;
a flexible second tubular segment having opposite ends and comprising second filamentary members interlaced together, said second filamentary members being different from said first, one end of said first segment being joined to one end of said second segment, said second segment being reverse folded and drawn coaxially within said first segment to form inner and outer adjacent layers surrounding a central space, a reverse fold defining one end of said sleeve; and
a third tubular segment comprising interlaced filamentary members and having opposite ends, one of said ends of said third segment being joined to another end of said first segment, said third segment being drawn coaxially over said first segment to form another outer layer surrounding said inner and outer adjacent layers, another reverse fold defining another end of said sleeve.

15. A sleeve according to claim 14, wherein said reverse folds are positioned between said segments.

16. A sleeve according to claim 15, wherein said first, second and third segments are approximately equal in length.

17. A sleeve for receiving elongated items, said sleeve comprising:
a flexible first tubular segment having opposite ends and comprising first filamentary members interlaced together; and
a flexible second tubular segment having opposite ends and comprising second filamentary members interlaced together, said second filamentary members comprising heat resistant mineral fibers, one end of said first segment being joined to one end of said second segment, said second segment being reverse folded and drawn coaxially within said first segment to form inner and outer adjacent layers surrounding a central space, a reverse fold defining one end of said sleeve.

18. A sleeve according to claim 17, wherein said mineral fibers are selected from the group comprising glass, quartz, silica and ceramic fibers.

19. A sleeve according to claim 17, wherein said first filamentary members are selected from the group consisting of DREF yarns and oxidized polyacrylonitrile fibers.

20. A sleeve according to claim 19, wherein said DREF yarns comprise a core of glass surrounded by para-aramid fibers.

21. A sleeve for receiving elongated items, said sleeve comprising:
a flexible first tubular segment having opposite ends and comprising first filamentary members knitted together with a first knit density; and
a flexible second tubular segment having opposite ends and comprising second filamentary members knitted together with a second knit density different from said first knit density, said second filamentary members being different from said first, one end of said first segment being joined to one end of said second segment, said second segment being reverse folded and drawn coaxially within said first segment to form inner and outer adjacent layers surrounding a central space, a reverse fold defining one end of said sleeve.

22. A sleeve according to claim 21, wherein said first segment is knitted with a knit density higher than said second segment to provide abrasion resistance to said outer layer.

23. A sleeve for receiving elongated items, said sleeve comprising:
a flexible first tubular segment having opposite ends and comprised of filamentary members interlaced together;
a flexible second tubular segment having opposite ends and comprised of filamentary members interlaced together, one end of said first segment being joined to one end of said second segment, said second segment being drawn coaxially within said first segment to form inner and outer adjacent layers surrounding a central space, a reverse fold being formed and defining one end of said sleeve; and
a plurality of ribs formed lengthwise along one of said first and said second segments, said ribs being positioned between said inner and outer adjacent layers, said ribs separating said layers and forming a plurality of air pockets therebetween.

24. A sleeve according to claim 23, wherein said first segment is comprised of first filamentary members and said second segment is comprised of second filamentary members different from said first filamentary members.

25. A sleeve according to claim 23, wherein said first and second segments are substantially equal in length, other ends of said first and second segments being positioned adjacent to one another and defining another end of said sleeve.

26. A sleeve according to claim 23, wherein said filamentary members are interlaced by knitting, said second segment comprising a rib-knit stitch, said ribs being integrally formed in said second segment.

27. A sleeve according to claim 23, wherein said filamentary members are interlaced by knitting, said first segment comprising a rib-knit stitch, said ribs being integrally formed in said first segment.

28. A sleeve for receiving elongated items, said sleeve comprising:
a flexible first tubular segment having opposite ends and comprised of filamentary members interlaced together;
a flexible second tubular segment having opposite ends and comprised of filamentary members interlaced together;
a flexible third tubular segment having opposite ends and comprised of filamentary members interlaced together;
one end of said first segment being joined to one end of said second segment, an opposite end of said first segment being joined to one end of said third segment, said second segment being drawn coaxially within said first segment, said third segment being drawn coaxially over said first segment, said first, second and third segments surrounding a central space, a pair of reverse folds being formed at opposite ends of said sleeve.

29. A sleeve according to claim 28, wherein said filamentary members comprising said second and said third segments are comprised of different material from said filamentary members comprising said first segment.

30. A sleeve according to claim 29, wherein said second and said third segments are comprised of the same material.

31. A sleeve for receiving elongated items, said sleeve comprising:
an elongated, flexible, continuous tube comprising a plurality of base filamentary members interlaced together;
a first portion of said tube having a first plurality of filamentary members interlaced with said base filamentary members;
a second portion of said tube having a second plurality of filamentary members interlaced with said base filamentary members;
a third portion of said tube having a third plurality of filamentary members interlaced with said base filamentary members;
said tube being twice reverse folded with said first portion of said tube being positioned within said second portion of said tube; and
said second portion of said tube being positioned within said third portion of said tube.

32. A sleeve according to claim 31, wherein said first portion is positioned in spaced relation to said second portion along said tube.

33. A sleeve according to claim 31, wherein one of said reverse folds is positioned between said first and said second portions.

34. A sleeve according to claim 31, wherein said third portion is positioned in spaced relation to said second portion along said tube.

35. A sleeve according to claim 31, wherein one of said reverse folds is positioned between said second and said third portions.

36. A sleeve for receiving elongated items, said sleeve comprising:
an elongated, flexible, continuous tube comprising a plurality of base filamentary members interlaced together;
said base filamentary members comprise flexible, resilient metal wire;
a first portion of said tube having a first plurality of filamentary members interlaced with said base filamentary members;
a second portion of said tube having a second plurality of filamentary members interlaced with said base filamentary members; and
said tube being reverse folded with said first portion of said tube being positioned within said second portion of said tube.

37. A sleeve for receiving elongated items, said sleeve comprising:
an elongated, flexible, continuous tube comprising a plurality of base filamentary members interlaced together;
a first portion of said tube having a first plurality of filamentary members interlaced with said base filamentary members, said first filamentary members comprise temperature resistant material selected from the group consisting of silica, glass and quartz;
a second portion of said tube having a second plurality of filamentary members interlaced with said base filamentary members; and
said tube being reverse folded with said first portion of said tube being positioned within said second portion of said tube.

38. A sleeve according to claim 31, wherein said filamentary members are interlaced by knitting.

39. A sleeve for receiving elongated items, said sleeve comprising an elongate continuous tube subdivided into a plurality of tubular segments integrally joined end to end to one another, one of said tubular segments being comprised of knitted first filamentary members having a first knit stitch density, another of said tubular segments being comprised of knitted second filamentary members having a second knit stitch density different from said first knit stitch density, said one tubular segment being drawn coaxially within said other tubular segment thereby forming multiple layers adjacent one another surrounding a central space for receiving said items.

40. A sleeve according to claim 39, wherein said first filamentary members are comprised of a first material and said second filamentary members are comprised of a second material different from said first material.

41. A sleeve according to claim 39, wherein said first filamentary members are comprised of a first material having a first set of properties and said second filamentary members are comprised of a second material having properties different from the properties of said first material.

42. A method of forming a sleeve for receiving elongated items, the method comprising the steps of:
selecting first filamentary members;
knitting said first filamentary members using said a rib-knit stitch having a first predetermined knit stitch density to form a first flexible tubular segment having oppositely disposed ends;
selecting second filamentary members;
interlacing said second filamentary members using a rib-knit stitch having a second knit stitch density to form a second flexible tubular segment, said second filamentary members being continuously interlaced with said first filamentary members to form said second flexible tubular segment continuously from one end of said first flexible tubular segment; and drawing said second tubular segment coaxially within said first tubular segment.

43. A method according to claim 42, wherein said second filamentary members selected are different from said first filamentary members.

44. A sleeve for receiving elongated items, said sleeve comprising:
- a flexible first tubular segment having opposite ends and comprised of filamentary members interlaced together;
- a flexible second tubular segment having opposite ends and comprised of filamentary members interlaced together;
- a flexible third tubular segment having opposite ends and comprised of filamentary members interlaced together;
- one end of said first segment being joined to one end of said second segment, an opposite end of said first segment being joined to one end of said third segment, said second segment being drawn coaxially within said first segment, said third segment being drawn coaxially within said first segment, said first, second and third segments surrounding a central space, a pair of reverse folds being formed at opposite ends of said sleeve.

* * * * *